(12) United States Patent
Tokunaga (10) Patent No.: US 10,046,891 B2
(45) Date of Patent: Aug. 14, 2018

(54) LID AND FOREIGN BODY-TRAPPING METHOD (71) Applicant: Sakai Display Products Corporation, Sakai-shi, Osaka (JP)

(72) Inventor: Hiroaki Tokunaga, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 106 days.

(21) Appl. No.: 15/119,090

(22) PCT Filed: Feb. 20, 2014

(86) PCT No.: PCT/JP2014/053992
§ 371 (c)(1),
(2) Date: Aug. 15, 2016

(87) PCT Pub. No.: WO2015/125244
PCT Pub. Date: Aug. 27, 2015

(65) Prior Publication Data
US 2017/0050781 A1 Feb. 23, 2017

(51) Int. Cl.
*B65D 51/24* (2006.01)
*B01D 21/00* (2006.01)
(Continued)

(52) U.S. Cl.
CPC ........... *B65D 51/24* (2013.01); *B01D 21/003* (2013.01); *B65D 1/0246* (2013.01); *B65D 41/04* (2013.01)

(58) Field of Classification Search
CPC .............. B01D 21/0006; B01D 21/003; B01D 21/2483; B65D 41/04; B65D 51/24
(Continued)

(56) References Cited

U.S. PATENT DOCUMENTS 55,341 A     6/1866   Morse
1,446,056 A * 2/1923   Misener ............. F01M 11/0408
                                                        210/532.1
(Continued)

FOREIGN PATENT DOCUMENTS

DE           3600652    *   9/1986
JP         2003-225515 A     8/2003
(Continued)

*Primary Examiner* — Christopher Upton
(74) *Attorney, Agent, or Firm* — Rudy J. Ng; Bret E. Field; Bozicevic, Field & Francis LLP (57) ABSTRACT

Provided are: a lid capable of capturing a foreign substance from a liquid crystal material in advance before the liquid crystal material is used; and a method of capturing a foreign substance.

In a lid (20) including a bottom part (22) closing an opening on one end of a circumferential part (21) having a tubular shape is provided and a circumferential part (21) placed over a tubular part having an opening of a container provided at the container, the bottom part (22) covering the tubular part, the lid further includes a partition board (211) provided at an inner surface of the circumferential part in a slanted direction against the bottom part (22) and dividing the inside of the circumferential part (21) into a first space proximal to the bottom part (22) and a second space apart from the bottom part (22), and a connection part (213) which connects the first space with the second space being provided at a portion of the partition board (211) closest to the bottom part (22).

8 Claims, 7 Drawing Sheets

(51) Int. Cl.
*B65D 1/02* (2006.01)
*B65D 41/04* (2006.01)

(58) Field of Classification Search
USPC .......... 210/800, 514, 518, 532.1; 215/6, 227
See application file for complete search history.

(56) References Cited

U.S. PATENT DOCUMENTS

| | | | | |
|---|---|---|---|---|
| 1,793,048 | A * | 2/1931 | Brigel | B65D 51/24 210/532.1 |
| 1,796,478 | A * | 3/1931 | Rose | B65D 51/24 210/514 |
| 1,865,023 | A * | 6/1932 | Leavy | B65D 51/24 210/514 |
| 1,892,884 | A | 1/1933 | Grauman et al. | |
| 2,139,961 | A * | 12/1938 | Kleid | B65D 51/24 210/514 |
| 2,418,630 | A * | 4/1947 | Febbraro | B65D 51/24 210/514 |
| 2,779,472 | A | 1/1957 | Febbraro | |
| 3,072,261 | A * | 1/1963 | Smith | F15B 21/041 210/532.1 |
| 4,932,543 | A * | 6/1990 | Martus | B65D 51/24 215/227 |
| 5,614,236 | A * | 3/1997 | Klang | C12G 1/08 210/532.1 |
| 5,868,946 | A | 2/1999 | Nguyen | |
| 6,260,474 | B1 * | 7/2001 | Yahav | B65D 51/24 215/6 |
| 8,113,359 | B2 * | 2/2012 | Perryman | B01D 21/0006 210/514 |
| 2004/0206678 | A1 | 10/2004 | Takahashi et al. | |
| 2006/0092371 | A1 | 5/2006 | Motomatsu | |
| 2017/0036142 | A1 * | 2/2017 | Siu | B01D 21/003 |

FOREIGN PATENT DOCUMENTS

| | | |
|---|---|---|
| JP | 2006-133251 A | 5/2006 |
| WO | WO2012176681 A1 | 12/2012 |

* cited by examiner

LID AND FOREIGN BODY-TRAPPING METHOD

CROSS-REFERENCE TO RELATED APPLICATIONS

This application is the national phase under 35 U. S. C. § 371 of PCT International Application No. PCT/JP2014/053992 which has an International filing date of Feb. 20, 2014 and designated the United States of America.

FIELD

The present invention relates to a lid which captures a foreign substance and to a method of capturing a foreign substance.

BACKGROUND

A technology exists which removes a foreign substance from a liquid crystal material (see, WO2012/176681 for example). A liquid crystal dropping device according to Patent Document 1 filters and removes a foreign substance contained in a liquid crystal material by a filter.

SUMMARY

In the case of the liquid crystal dropping device according to Patent Document 1, if a filter is clogged, a foreign substance cannot be filtered from a liquid crystal material through the filter. In order for the liquid crystal dropping device to continuously operate, the filter needs to be changed, which lowers the work efficiency.

The present invention has been made in view of the circumstances described above. An object of the present invention is to provide a lid capable of capturing a foreign substance from a liquid crystal material in advance before the liquid crystal material is used, and to provide a method of capturing a foreign substance.

A lid according to one embodiment of the present invention is characterized in that a lid comprising a circumferential part having a tubular shape and a bottom part closing an opening at one end of the circumferential part, the circumferential part being placed over a tubular part having an opening of a container formed at the container containing a liquid crystal material, and the bottom part covering the tubular part, the lid further comprises a partition board provided at an inner surface of the circumferential part in a slanted direction against the bottom part and dividing an inside of the circumferential part into a first space proximal to the bottom part and a second space apart from the bottom part; and a connection part connecting the first space with the second space, the connection part being provided at a portion of the partition board, the portion being closest to the bottom part.

The lid according to the embodiment of the present invention has a bottomed cylindrical shape covering a tubular part having an opening of a container which contains a liquid crystal material. The lid includes a circumferential part which has a tubular shape and a bottom part which closes an opening at one end of the circumferential part. A partition board is provided on the inner surface of the circumferential part in a slanted direction against the bottom part. The partition board divides the inside of the circumferential part into a first space proximal to the bottom part and a second space apart from the bottom part. At a portion of the partition board which is closest to the bottom part, a connection part is provided which connects the first space with the second space.

Accordingly, in the case where the lid is attached to the container which contains the liquid crystal material including a foreign substance and the container is so inverted that the attached lid is located at a lower side with respect to the container, a foreign substance with a specific gravity larger than that of the liquid crystal material may be captured in the first space.

In the embodiment of the present invention, the partition board may has a shape of a funnel recessed toward the bottom part with the connection part being a center.

In the lid according to the embodiment of the present invention, the partition board may has the shape of a funnel with the connection part being the center, and may be recessed toward the bottom part.

This causes foreign substances sinking in the liquid crystal material to be collected at the connection part and efficiently captured in the first space.

In the embodiment of the present invention, it is preferred that the connection part is provided near the circumferential part.

In the lid according to the embodiment of the present invention, the connection part is provided near the circumferential part.

Accordingly, in the case where the container is turned upside down so as to remove the foreign substances captured in the lid, inverse flow of the foreign substances from the lid to the container may be prevented by selecting the direction of inversion.

In the embodiment of the present invention, the lid may further comprise an extension part extending inward from the circumferential part within the first space at the portion of the partition board, the portion being closest to the bottom part, wherein the connection part is provided at the extension part.

In the lid according to the embodiment of the present invention, an extension part extending inward from the circumferential part within the first space may be provided at the portion of the partition board which is closest to the bottom part. The connection part may be provided at the extension part.

Accordingly, the connection part may be provided so as to make connection through the partition board and the extension part while winding, and an opening of the connection part proximal the first space is provided on the inner side wall of the extension part, which can effectively prevent foreign substances from flowing backward from the lid to the container when the container is turned upside down.

In the embodiment of the present invention, it is preferred that the connection part is a through hole or a slit.

In the lid according to the embodiment of the present invention, the connection part is a through hole or a slit.

This causes foreign substances sinking in the liquid crystal material to be collected in the through hole or slit and efficiently captured in the first space.

In the embodiment of the present invention, the bottom part may be configured to be detachable from the circumferential part.

In the lid according to the embodiment of the present invention, the bottom part may be configured to be detachable from the circumferential part.

Accordingly, in the case where a foreign substance is captured in the lid, the lid may be detached from the container and the bottom part of the lid detached from the container is removed from the circumferential part so as to easily discard the foreign substance captured in the lid.

In the embodiment of the present invention, the bottom part may have a bottomed cylindrical shape, the circumferential part may have a cylindrical shape, and the bottom part may be configured to be detachable by an inner circumference on an opening edge of the bottom part being screwed with an outer circumference at one end part of the circumferential part.

In the embodiment of the present invention, the bottom part may has a cylindrical shape with a closed bottom and the circumferential part may has a cylindrical shape without a closed bottom. In the embodiment, the inner circumference on the opening edge of the bottom part is screwed with the outer circumference of one end part of the circumferential part, so that the bottom part may be attached to and detached from the circumferential part.

This allows the bottom part to rotate with respect to the circumferential part so as to be easily detached from the circumferential part.

A method according to one embodiment of the present invention is characterized in that a method of capturing a foreign substance contained in a liquid crystal material in the container by the lid as described above attached to the tubular part of the container, in the container is inverted so that the attached lid is located at a lower side with respect to the container, and a foreign substance sinking in the liquid crystal material is moved along the partition board, is introduced into the first space through the connection part and is captured in the first space.

In the method of capturing a foreign substance according to the embodiment of the present invention, the lid as described above is used to capture a foreign substance included in the liquid crystal material within the container. The container is inverted so that the attached lid is located at the lower side with respect to the container. The foreign substance sinking in the liquid crystal material is moved to the connection part along the partition board, passes through the connection part and is captured in the first space.

Accordingly, a foreign substance with a specific gravity larger than that of the liquid crystal material may be captured in the first space of the lid.

In the embodiment of the present invention, the container may be vibrated in a case where the container is inverted.

In the method of capturing a foreign substance according to the embodiment of the present invention, the container may be vibrated if inverted.

This allows the foreign substance to be peeled off from the inner wall of the container in the case where the foreign substance sinking in the liquid crystal material is adhered to the inner wall of the container.

In the embodiment of the present invention, the inverted container may be returned to a posture before inversion while a posture of the lid is so maintained that an opening proximal to the second space of the connection part in the lid is located higher than the opening proximal to the first space.

In the method of capturing the foreign substance according to the embodiment of the present invention, the inverted container may be returned to the posture before inversion. Here, the posture of the lid is so maintained that the opening proximal to the second space of the connection part in the lid is located higher than the opening proximal to the first space.

Accordingly, in the case where the inverted container is returned to the posture before inversion, the foreign substance captured in the first space may be prevented from flowing backward to the second space due to the effect of gravity.

Effect of the Invention

With the lid and the method of capturing a foreign substance according to the embodiment of the present invention, a foreign substance may be captured from a liquid crystal material in advance before the liquid crystal material is used.

The above and further objects and features will more fully be apparent from the following detailed description with accompanying drawings.

DETAILED DESCRIPTION

A container and a lid according to an embodiment will be described with reference to the drawings illustrating the same. A liquid crystal material is contained in the container. The container has an opening for injecting the liquid crystal material into itself and for taking out the injected liquid crystal material. The lid is to close the opening of the container. When the lid is opened or closed for using the liquid crystal material in the container, or when defoaming is carried out for evacuating the air from the liquid crystal material in the container, a foreign substance may possibly be mixed into the liquid crystal material within the container. Moreover, a foreign substance may also be mixed into the liquid crystal material at the time of collecting the liquid crystal material remaining at the bottom of the container. The lid has a function of capturing the foreign substance mixed into the liquid crystal material.

Figure 1:
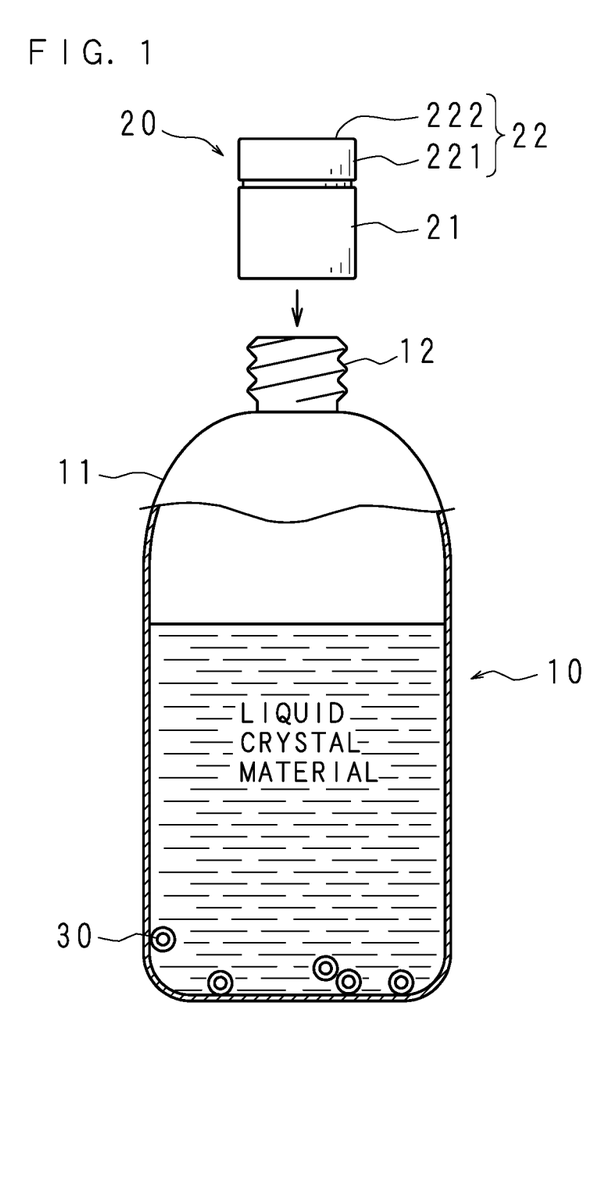
FIG. 1 illustrates a liquid crystal bottle and a lid.

FIG. 1 illustrates a liquid crystal bottle 10 and a lid 20. FIG. 1 is a side view of the liquid crystal bottle 10 and the lid 20. The liquid crystal bottle 10 is an example of the container which contains a liquid crystal material. The liquid crystal bottle 10 is made of, for example, glass. The height of the liquid crystal bottle 10 is, for example, 20 cm.

The lower and middle parts of the liquid crystal bottle 10 form a bottomed cylindrical shape. The upper part of the liquid crystal bottle 10 includes a shoulder part 11 and a bottle opening 12. The shoulder part 11 has a shape narrowing toward the upper side, and has an arc shape which is bulged in a diagonally upward direction in a side view. The bottle opening 12 has a cylindrical shape and is provided in the middle at the upper side of the shoulder part 11. A helical male thread is provided on the outer circumferential surface of the bottle opening 12.

The liquid crystal material contained in the liquid crystal bottle 10 may include a foreign substance 30. The foreign substance 30 has a specific gravity larger than the specific gravity of the liquid crystal material, i.e. 0.98-1.01. The foreign substance 30 is, for example, polyvinyl chloride (1.16-1.58), acrylic resin (1.17-1.28), nylon (registered trademark) (1.07-1.42), or phenol resin (1.21-1.30). The numeric values in the parentheses indicate the specific gravity. The specific gravity here is a ratio of the density of a substance to the density of distilled water at 4 degrees Celsius. The size of the foreign substance 30 is, for example, 10 to 500 μm.

Since the specific gravity of the foreign substance 30 is larger than the specific gravity of the liquid crystal material, the foreign substance 30 is located near the bottom of the liquid crystal bottle 10 in FIG. 1. It is noted that the foreign substance 30 illustrated in FIG. 1 is exaggerated in its size.

Figure 2:
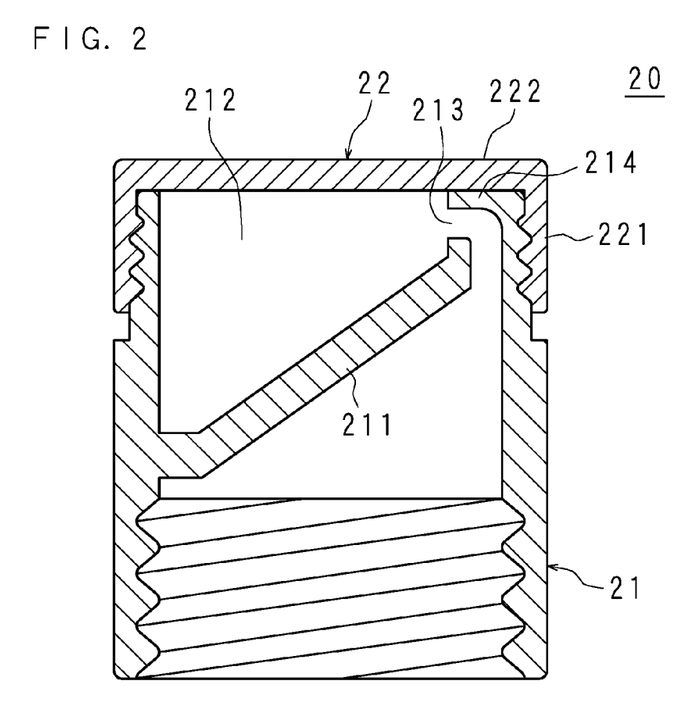
FIG. 2 is a vertical section view of the lid.

FIG. 2 is a vertical section view of the lid 20. The lid 20 is a member for covering the bottle opening 12 of the liquid crystal bottle 10 and is made of synthetic resin, for example. The lid 20 has a substantially bottomed cylindrical shape. The lid 20 includes a side wall part (circumferential part) 21 and a bottom wall part (bottom part) 22. The side wall part 21 has a cylindrical shape, which internally includes a structure for capturing a foreign substance mixed into the liquid crystal material. The side wall part 21 and the bottom wall part 22 are configured to be detachable.

The bottom wall part 22 has a flat-bottomed cylindrical shape. The bottom wall part 22 has a side wall 221 and a bottom wall 222. The side wall 221 has a cylindrical shape. The height of the side wall 221 is lower than the height of the side wall part 21. The outer diameter of the side wall 221 is substantially the same as the outer diameter of the side wall part 21. The outer diameter of the upper part of the side wall part 21 is, however, slightly smaller than the outer diameter of the side wall 221. Furthermore, the height of the upper part of the side wall part 21 with the slightly smaller outer diameter is slightly higher than the height of the side wall 221. Thus, in the case where the side wall part 21 and the bottom wall part 22 are connected with each other, a ring-like groove is formed in the lid 20, in appearance, between the side wall 221 and the side wall part 21 thereunder.

The bottom wall 222 has the shape of a circular disc, and constitutes the ceiling of the bottom wall part 22.

The side wall part 21 includes a partition board 211. The partition board 211 is provided on the inner wall surface of the side wall part 21 in a slanted direction against a plane defined by the end of the side wall part 21 or the bottom wall 222 of the bottom wall part 22. At the upper part of the lid 20 in FIG. 2, a hollow part (first space) 212 is formed which is defined by the partition board 211, the side wall part 21 and the bottom wall 222 of the bottom wall part 22.

Figure 3:
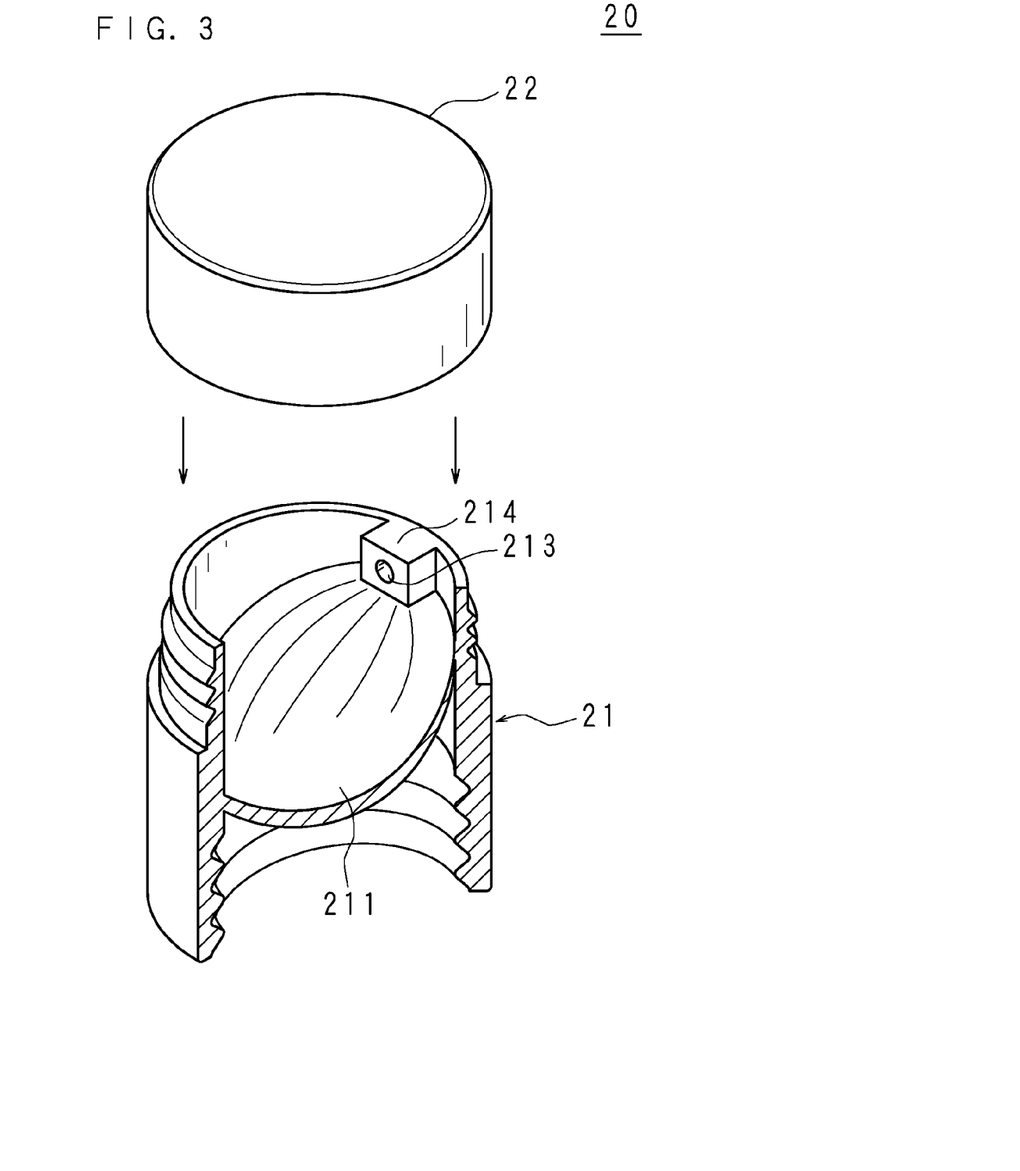
FIG. 3 illustrates a perspective view of the lid.

In the space between the bottom wall 222 and the portion of the partition board 211 which is closest to the bottom wall 222, an extension part 214 is provided which extends from the portion of the partition board 211 and the inner surface of the side wall part 21 toward the bottom wall 222 and toward the inner side, respectively (see FIG. 3). A through hole 213 is formed in the portion of the partition board 211 which is closest to the bottom wall 222 and in the extension part 214. As illustrated in FIG. 2, the through hole 213 has a function of connecting the hollow part 212 above the partition board 211 with the space (second space) below the partition board 211. In the cross-section in FIG. 2, the through hole 213 has the shape of an inverted J. In FIG. 2, the opening at the lower side in the through hole 213 is opened toward the lower direction (see FIG. 4). In FIG. 2, the opening at the upper side in the through hole 213 is opened toward the hollow part 212 (see FIG. 3).

FIG. 3 illustrates a perspective view of the lid 20 from one side. FIG. 3 illustrates the lid 20 in the state where the side wall part 21 is separated from the bottom wall part 22. FIG. 3 illustrates the inside of the side wall part 21 seen from one diagonal side while a part of the side wall part 21 is broken.

A helical female thread is formed on the lower inner surface of the side wall part 21. By the male thread of the bottle opening 12 at the liquid crystal bottle 10 being screwed to or unscrewed from the female thread of the lid 20, the lid 20 is attached to or detached from the bottle opening 12 of the liquid crystal bottle 10.

Figure 4:
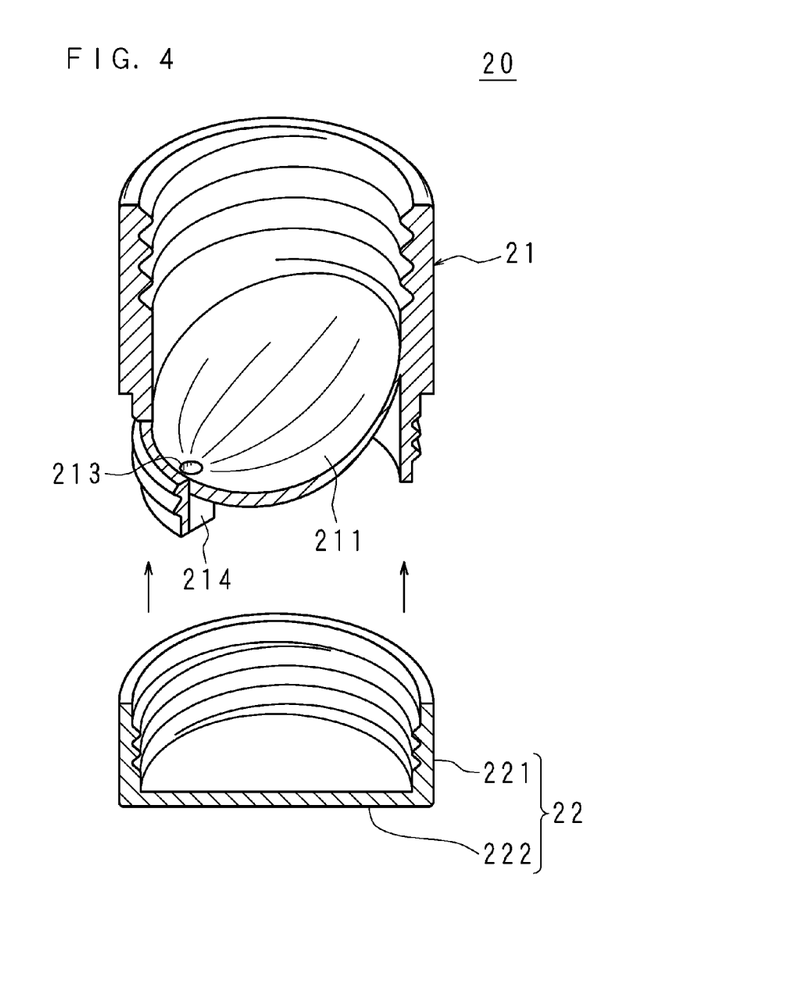
FIG. 4 illustrates a perspective view of the lid.

FIG. 4 illustrates a perspective view of the lid 20 from another side. FIG. 4 illustrates the lid 20 in the state where the lid 20 as shown in FIG. 3 is inverted and the side wall part 21 is separated from the bottom wall part 22. FIG. 4 illustrates the inside of the side wall part 21 seen from another diagonal side while a part of the side wall part 21 is broken. A female thread is formed on the inner surface of the side wall 221 of the bottom wall part 22. A helical male thread is formed on the upper outer surface of the side wall part 21. By the female thread of the bottom wall part 22 being screwed to or unscrewed from the male thread of the side wall part 21, the bottom wall part 22 is attached to or detached from one end of the side wall part 21.

In FIG. 4 where the side wall part 21 in FIG. 3 is inverted, the surface of the partition board 211 has a curved surface which is warped downward. As illustrated in FIG. 4, any part of the surface of the partition board 211 has the shape of a funnel inclined toward the through hole 213. As such, the partition board 211 is recessed downward in FIG. 4 and is bulged upward in FIG. 3.

Next, the liquid crystal bottle 10 and the lid 20 are used to describe a method of capturing a foreign substance 30 mixed into the liquid crystal material. In the description below, the foreign substance 30 is captured in the hollow part 212 of the lid 20.

Figure 5:
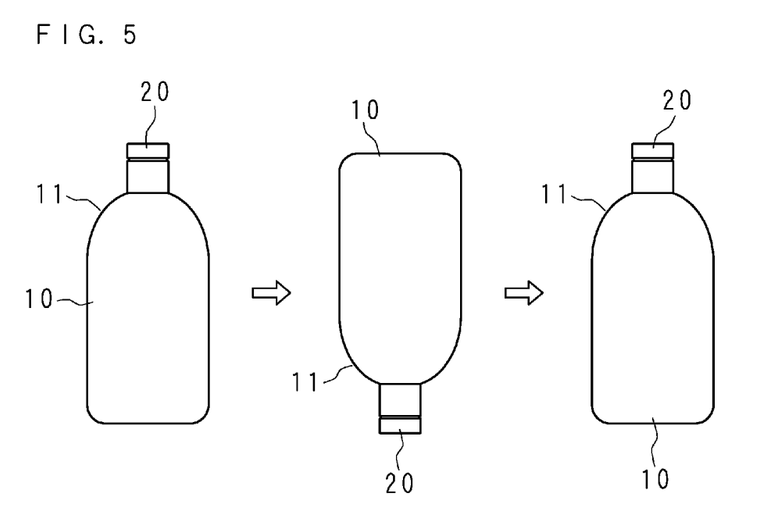
FIG. 5 illustrates the outline of the procedure of the method of capturing a foreign substance.

FIG. 5 illustrates the outline of the procedure of the method of capturing a foreign substance. The arrows in FIG. 5 indicate the order of the procedure. First, the liquid crystal bottle 10 containing a liquid crystal material is prepared. The lid 20 is attached to the bottle opening 12 of the liquid crystal bottle 10 in the state where the bottle opening 12 is located at the upper side. The liquid crystal bottle 10 with the lid 20 attached thereto is inverted, and is left for half a day, for example.

Next, the liquid crystal bottle 10 with the lid 20 attached thereto is turned upside down. The lid 20 is detached from the liquid crystal bottle 10. This ensures the foreign substance 30 to be removed from the liquid crystal material in the liquid crystal bottle 10.

The bottom wall part 22 of the lid 20 which is detached from the liquid crystal bottle 10 is further detached from the side wall part 21 of the lid 20. The foreign substance 30 stored in the hollow part 212 of the lid 20 is discarded. In the case where the foreign substance 30 is discarded, the lid 20 may be reused after washing.

In a period during which the foreign substance 30 sinks in the liquid crystal material and moves to the hollow part 212, the foreign substance 30 may possibly be adhered to the inner surfaces of the liquid crystal bottle 10 and the lid 20. Possible portions on the inner surfaces of the liquid crystal bottle 10 and the lid 20 to which the foreign substance 30 is adhered include the shoulder part 11 of the liquid crystal bottle 10, the surface of the partition board 211 and the inner surface of the through hole 213. Thus, in order for the foreign substance 30 not to be adhered to the inner surface of the liquid crystal bottle 10 or the lid 20, or to peel off the foreign substance 30 adhered to the inner surface of the liquid crystal bottle 10 or the lid 20, the liquid crystal bottle 10 and the lid 20 are vibrated while the liquid crystal bottle 10 with the lid 20 attached thereto is inverted and left. The method of vibrating the liquid crystal bottle 10 is carried out, for example, by the use of ultrasonic.

Figure 6:
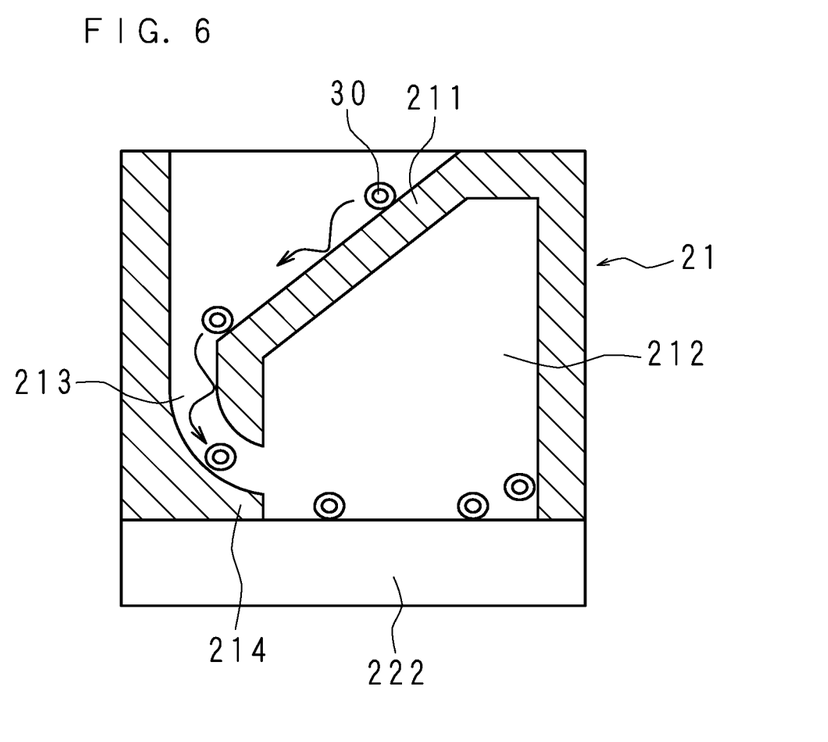
FIG. 6 schematically illustrates the movement of the foreign substance to the hollow part in the liquid crystal bottle and the lid in the inverted state.

FIG. 6 schematically illustrates the movement of the foreign substance 30 to the hollow part 212 in the liquid crystal bottle 10 and the lid 20 in the inverted state. The foreign substance 30 mixed into the liquid crystal material sinks to the lower part of the liquid crystal bottle 10 due to the effect of the gravity. The foreign substance 30 which sinks in the liquid crystal material to the partition board 211 moves to the opening of the through hole 213 along the inclined direction of the partition board 211. The foreign substance 30 passes through the through hole 213 having the J-shape in FIG. 6, and is captured in the hollow part 212.

Figure 7:
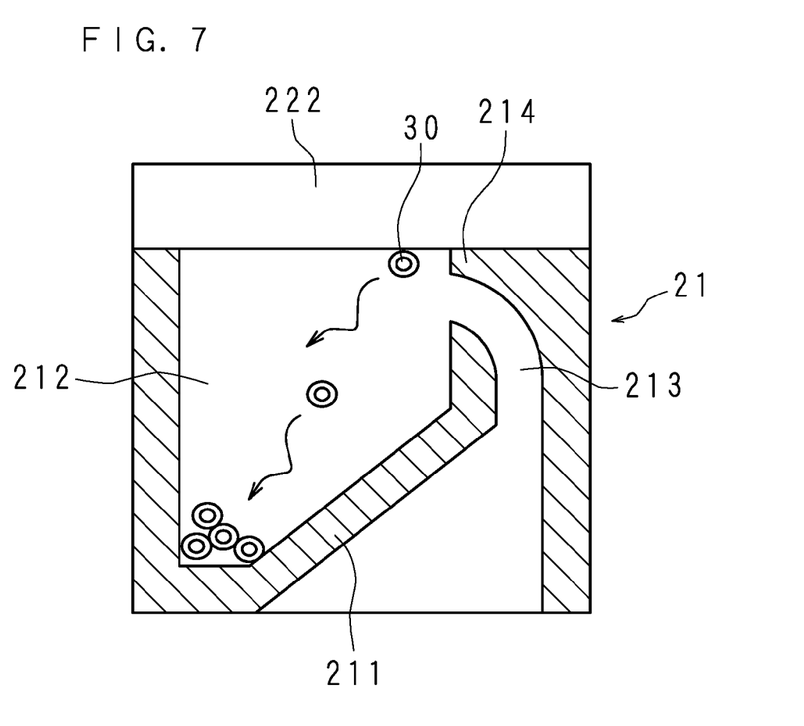
FIG. 7 illustrates the movement of the foreign substance in the hollow part.

FIG. 7 illustrates the movement of the foreign substance 30 in the hollow part 212. FIG. 7 illustrates the movement of the foreign substance 30 from the upper part of the hollow part 212 to the lower part of the hollow part 212 due to the effect of the gravity in the case where the liquid crystal bottle 10 and the lid 20 are turned upside down from the inverted state. The foreign substance 30 moved to the lower portion of the hollow part 212 is collected in the recess at the lower portion of the hollow part 212.

In the case where the liquid crystal bottle 10 and the lid 20 are returned from the inverted state to the state before inversion which is turned upside down, the foreign substance 30 once captured in the hollow part 212 may inadvertently pass through the through hole 213 together with the liquid crystal material and may possibly flow back to the liquid crystal bottle 10. In the case where the liquid crystal bottle 10 and the lid 20 are returned from the inverted state to the state before inversion, the liquid crystal bottle 10 and the lid 20 are made to stand in the state where the opening of the through hole 213 proximal to the liquid crystal bottle 10 is located above the opening of the through hole 213 proximal to the hollow part 212. This can prevent the foreign substance 30 from flowing backward to the liquid crystal bottle 10 from the hollow part 212. For that purpose, a mark indicating the direction in which the through hole 213 is formed with respect to the center of the lid 20 or a relative position of the through hole 213 in the lid 20 may be put at, for example, a portion on the outer circumferential surface of the side wall part 21. When the liquid crystal bottle 10 and the lid 20 are returned back to the state before inversion, the liquid crystal bottle 10 and the lid 20 are turned upside down so that the side with the mark faces upward.

According to the present embodiment, the bottle opening 12 of the liquid crystal bottle 10 is closed by the lid 20. The lid 20 may, however, also close a container which contains a substance other than the liquid crystal material. That is, the lid 20 may also be utilized to capture, from a solution contained in the container, a foreign substance with a specific gravity larger than that of the solution.

According to the present embodiment, the partition board 211 has the shape of a funnel. The partition board 211 may however be a flat plate extending in a slanted direction against the bottom wall 222.

According to the present embodiment, the through hole 213 serves as the connection part for connecting the hollow part 212 with the space inside the liquid crystal bottle 10. The connection part may, however, be a slit formed by enlarging the through hole 213 along the inner circumferential surface of the side wall part 21.

According to the present embodiment, the through hole 213 may be formed at the circumferential part of the partition board 211.

According to the present embodiment, the bottom wall part 22 has a bottomed cylindrical shape. However, the bottom wall part 22 may alternatively have the shape of a circular disc. In such a case, the structure for fixing the bottom wall part 22 with the side wall part 21 may employ a fixing structure other than screwing with a male thread and a female thread. For example, the structure for fixing the bottom wall part 22 with the side wall part 21 may be the same as the fixing structure of a Tupperware (registered trademark) in which a lid is fixed to the container while a groove formed at the lid is engaged with a edge of the container.

Alternatively, the bottom wall part 22 may have the shape of a cylinder. In such a case, the structure for fixing the bottom wall part 22 with the side wall part 21 may be realized, for example, by fitting the bottom wall part 22 to the inner surface of the side wall part 21.

According to the present embodiment, the liquid crystal bottle 10 is inverted in order to capture the foreign substance 30 in the lid 20. However, a centrifugal separator may be used for capturing the foreign substance 30 in the lid 20. The centrifugal separator is driven while the liquid crystal bottle 10 is set to the centrifugal separator so that the centrifugal force is applied to the liquid crystal bottle 10 in the direction of the lid 20. This applies the centrifugal force of 1G or larger to the liquid crystal material and the foreign substance 30, and therefore the time for capturing the foreign substance 30 in the lid 20 may be shortened.

According to the lid 20, a foreign substance 30 may be captured from the liquid crystal material in advance before the liquid crystal material is used.

Due to the effect of the gravity, the foreign substance 30 which sinks in the liquid crystal material is collected in the through hole 213 of the lid 20 and is captured from the through hole 213 into the hollow part 212 of the lid 20. Thereafter, the lid 20 is detached from the liquid crystal bottle 10 to reliably remove the foreign substance 30 from the liquid crystal material.

It is to be noted that, as used herein and in the appended claims, the singular forms "a", "an", and "the" include plural referents unless the context clearly dictates otherwise.

It should be understood that the embodiments disclosed herein are illustrative and non-restrictive in every respect. Since the scope of the present invention is defined by the appended claims rather than by the description preceding them, all changes that fall within metes and bounds of the claims, or equivalence of such metes and bounds thereof are therefore intended to be embraced by the claims.

The technical features (components) described in each example embodiment may be combined with one another, and such combinations may form new technical features.

The invention claimed is:
1. A lid comprising:
a circumferential part formed in a tubular shape;
a bottom part closing an opening at one end of the circumferential part and covering a tubular part having an opening of a container formed at the container containing a liquid crystal material in a case where the circumferential part is placed over the tubular opening;
a partition board provided at an inner surface of the circumferential part in a slanted direction against the bottom part and dividing an inside of the circumferential part into a first space proximal to the bottom part and a second space apart from the bottom part; and
a connection part provided at a portion of the partition board which is near the circumferential part and is closest to the bottom part in the partition board, and connecting the first space with the second space.

2. The lid according to claim 1, further comprising
an extension part extending inward from the circumferential part within the first space along a direction parallel to the bottom part at the portion of the partition board, the portion being closest to the bottom part,
wherein the connection part is provided at the extension part.

3. The lid according to claim 1, wherein
the connection part is a through hole or a slit.

4. The lid according to claim 1, wherein
the bottom part is configured to be detachable from the circumferential part.

5. The lid according to claim 4, wherein
the bottom part has a cylindrical shape with a closed bottom,
the circumferential part has a cylindrical shape, and
the bottom part is configured to be detachable by an inner circumference on an opening edge of the bottom part being screwed with an outer circumference at one end part of the circumferential part.

6. A method of capturing a foreign substance contained in a liquid crystal material in the container by the lid according to claim 1 attached to the tubular part of the container, wherein
the container is inverted so that the attached lid is located at a lower side with respect to the container, and
a foreign substance precipitating in the liquid crystal material is moved along the partition board, is introduced into the first space through the connection part and is captured in the first space.

7. The method of capturing a foreign substance according to claim 6, wherein
the container is vibrated in a case where the container is inverted.

8. The method of capturing a foreign substance according to claim 6, wherein
the container is turned upside down from an inverted state.

* * * * *